United States Patent
Wernberg et al.

(10) Patent No.: US 6,877,306 B2
(45) Date of Patent: Apr. 12, 2005

(54) NOZZLE ASSEMBLY WITH FLOW DIVIDER AND ECOLOGY VALVE

(75) Inventors: Donald E. Wernberg, Rockford, IL (US); John D. Tysver, Rockford, IL (US)

(73) Assignee: Woodward Governor Company, Rockford, IL (US)

( * ) Notice: Subject to any disclaimer, the term of this patent is extended or adjusted under 35 U.S.C. 154(b) by 96 days.

(21) Appl. No.: 10/360,976

(22) Filed: Feb. 7, 2003

(65) Prior Publication Data

US 2004/0154302 A1 Aug. 12, 2004

(51) Int. Cl.[7] .............................................. F02C 7/232
(52) U.S. Cl. ............................. 60/39.094; 137/247.13; 239/119; 251/126
(58) Field of Search ............................. 60/39.094, 786, 60/790; 137/247.13, 561 A; 239/119; 251/126, 356

(56) References Cited

U.S. PATENT DOCUMENTS

| | | | | |
|---|---|---|---|---|
| 829,462 A | * | 8/1906 | Curtin ......................... 251/126 |
| 1,224,181 A | * | 5/1917 | Lawler .................. 137/247.13 |
| 1,540,529 A | * | 6/1925 | Blaisdell ...................... 251/126 |
| 1,640,600 A | * | 8/1927 | Crosby .................. 137/247.13 |
| 2,038,229 A | * | 4/1936 | Ross et al. .................... 251/126 |
| 3,069,126 A | * | 12/1962 | Randall ....................... 251/126 |
| 3,504,697 A | * | 4/1970 | Colgan ....................... 137/469 |
| 3,724,494 A | * | 4/1973 | Alber .......................... 137/501 |
| 4,044,992 A | * | 8/1977 | Jukoff ......................... 251/126 |
| 4,206,595 A | | 6/1980 | Cole |
| 5,809,771 A | | 9/1998 | Wernberg |
| 6,195,978 B1 | | 3/2001 | Futa, Jr. |
| 6,422,021 B1 | | 7/2002 | Futa, Jr. et al. |
| 6,581,902 B2 | * | 6/2003 | Michau et al. .............. 251/126 |

* cited by examiner

*Primary Examiner*—Michael Koczo
(74) *Attorney, Agent, or Firm*—Leydig, Voit& Mayer, Ltd.

(57) ABSTRACT

A fuel system having an ecology valve controlling liquid flow through a retention passage when pressurized liquid is passed through the valve is presented. The retention passage winds between the valve outlet and a cavity such that no matter which way the valve is oriented gravity alone is unable to drain liquid from the cavity to the outlet. The ecology valve serves to suction fuel from fuel nozzle passages upon engine shutdown. Fuel is temporarily stored in the cavity and the retention passage. The ecology valve also provides a fuel splitting function for providing a port geometry determined split between fuel nozzles in the fuel system.

29 Claims, 9 Drawing Sheets

US 6,877,306 B2

NOZZLE ASSEMBLY WITH FLOW DIVIDER AND ECOLOGY VALVE

FIELD OF THE INVENTION

This invention relates generally to fuel delivery systems for engines and more particularly to ecology and fuel flow splitting functions for such fuel delivery systems.

BACKGROUND OF THE INVENTION

In many gas turbine engines, the fuel system for regulating the flow of fuel to the combustion chamber consists of one or more fuel nozzles arranged in the combustion chamber, a fuel pump for pressurizing fuel from the fuel supply, a fuel metering unit for controlling the flow of fuel to the fuel nozzles and one or more fuel manifolds fluidically connecting the fuel metering unit to the fuel nozzles.

During engine start-up, fuel is pumped from the fuel supply to the fuel metering unit by the fuel pump and, once a sufficient start-up pressure is attained, the pressurizing valve of the fuel metering unit opens and fuel is supplied to the fuel nozzles via the fuel manifold. Thereafter, the metering valve of the fuel metering unit modulates the rate of fuel flow from the fuel supply to the nozzles. As such, a single, continuous flow path exists from the fuel metering unit, through the fuel manifold, to the fuel nozzles.

In more advanced gas turbine aircraft engines, however, the fuel system includes additional components and has multiple flow paths. For example, a dual flow path fuel system may include multiple sets of fuel nozzles (i.e., a primary fuel nozzle and a secondary fuel nozzle), two fuel manifolds (i.e., a primary manifold and a secondary manifold), and a flow divider valve arranged downstream of the fuel metering unit. In such systems, the flow divider valve splits the flow of fuel from the fuel metering unit into two distinct flow paths, namely a primary flow path and a secondary flow path.

In dual flow path fuel systems, fuel is delivered to the primary and secondary nozzles in a predetermined and scheduled manner. For instance, during engine start-up, fuel is initially supplied only to the primary fuel nozzles. However, once the fuel from the primary fuel nozzles is burning in a steady and satisfactory manner, fuel is thereafter supplied to the secondary nozzles. Put another way, the primary flow path provides a pilot flow, or a flow which initiates the combustion process, while the secondary flow path provides a main flow, or a flow which supplements and intensifies the combustion process once the pilot flow is burning steadily.

Fuel systems for some gas turbine engines require an ecology function that removes a set amount of fuel from the fuel nozzles and manifolds upon cessation of engine operation. The removal of fuel serves two purposes. It prevents the fuel from trickling into the still hot combustion chamber, which causes the fuel nozzles in the engine to coke and/or the engine to smoke. This hinders engine performance and leads to premature failure of the nozzle. The removal of fuel also keeps the fuel from vaporizing into the atmosphere, which is not acceptable from an environmental standpoint.

Prior fuel systems such as disclosed in U.S. Pat. No. 5,809,771 to Wernberg use one ecology valve and one flow divider valve for all the nozzles when the fuel manifolds are small in diameter and there are relatively few nozzles. However, using one flow divider valve to split flow between multiple nozzle assemblies results in the addition of a second flow manifold. For small engines this is only a small weight and cost penalty. Larger engines utilizing many nozzle assemblies require proportionately larger and heavier ecology and flow divider valves as well as an additional large and heavy fuel manifold. To avoid this additional manifold some larger engines have small flow divider valves at each nozzle assembly. However, these flow divider valves do not provide the ecology function.

BRIEF SUMMARY OF THE INVENTION

The invention provides an ecology valve in a fuel system that also serves to divide fuel flow between nozzles. The ecology valve controls liquid flow through retention passages when pressurized liquid is passed through the valve such that no matter which way the valve is oriented gravity alone is unable to drain liquid from the valve inlet to the outlet. The retention passages includes grooves formed into either the valve body or in a sleeve that is inserted into the structure enclosing the retention passages.

In one embodiment, each retention passage includes a spiral section winding axially about an axis between spiral end portions. A nozzle passage is connected to the one of the spiral end portions and extends axially toward the other spiral end portion to prevent drainage of the liquid from a cavity in the valve that is connected to the other spiral end portions.

The ecology/flow divider valve has a pressure actuated piston slidably disposed within the valve body and is movable between a position corresponding to engine shut-down and a second position corresponding to engine operation. Spring means bias the piston toward the shut-down position. The piston forms the cavity as it moves. The cavities are sized such that fluid in a nozzle passage is pulled into a cavity when the piston moves from the operating position to the shut-down position.

Additional features and advantages of the invention will be made apparent from the following detailed description of illustrative embodiments which proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE INVENTION

Figure 1:
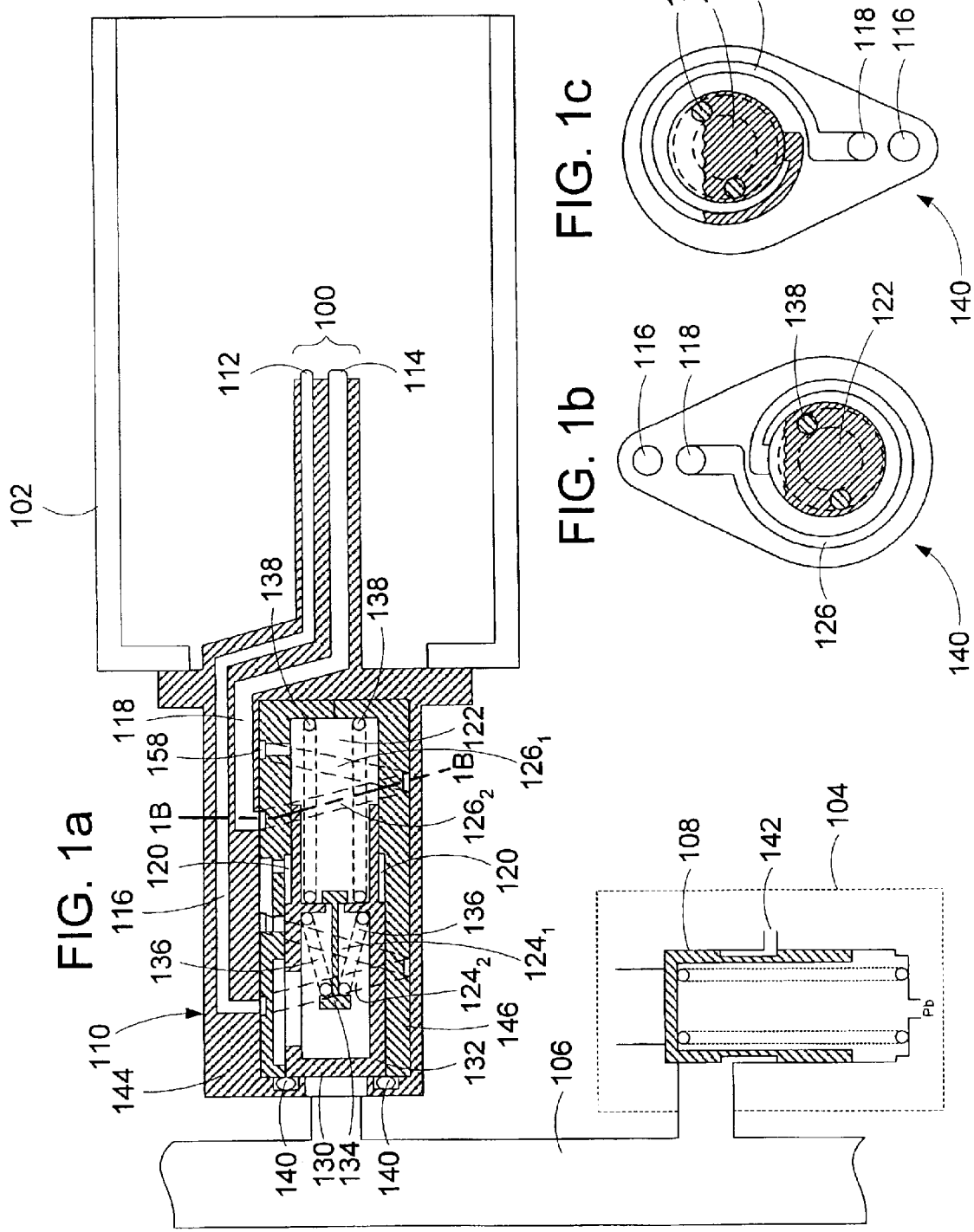
FIG. 1a is a cross-sectional view of the valve of the present invention with the valve in a deactivated position.
FIG. 1b is a cross-sectional view of the valve of FIG. 1a taken along line 1b.
FIG. 1c is the cross-sectional view of the valve of FIG. 1a rotated 180 degrees along line 1b.

Turning to the drawings, wherein like reference numerals refer to like elements, the invention is illustrated as being implemented in a suitable environment. As illustrated in FIG. 1a, the fuel system described herein generally comprises a plurality of fuel nozzles 100 arranged in a combustion chamber 102, a fuel metering unit 104, and a fuel manifold 106 disposed therebetween. It will be understood by those skilled in the art that the fuel metering unit 104 includes a pressurizing, shutoff, and drain valve 108 which delivers fuel to the fuel nozzles 100 once a predetermined start-up pressure is attained, and a metering valve (not shown) which modulates the fuel flow rate to the fuel nozzles 100 thereafter. It will also be understood that the fuel manifold 106 comprises any means which provides a fluidic connection between the fuel metering unit 104 and the fuel nozzles 100.

Flow is metered by the fuel control and passes into the engine fuel manifold 106 through the fuel control pressurizing, shutoff, and drain valve 108. The fuel manifold 106 supplies fuel to many nozzle assemblies. Each nozzle assembly 110 may have multiple nozzle tips. In the description that follows, two nozzle tips 112, 114 in the nozzle assembly 110 shall be used to describe the invention.

The nozzle assembly 110 has nozzle passages 116, 118 that connect the nozzle tips 112, 114 to ecology cavities 120, 122 via retention passage 124, 126 around the flow divider/ecology valve 130. For clarity, retention passage 124 is illustrated as having sections $124_1$ and $124_2$ and retention passage 126 is illustrated as having sections $126_1$ and $126_2$. The subscript nomenclature (e.g., $124_1$, $124_2$) is merely used to show the grooves. $124_1$ and $126_1$ are on the near side of sleeve 146 and grooves $124_2$ and $126_2$ are on the far side of sleeve 146. In the embodiment shown, retention passage 124, 126 is a 360 degree spiral groove. Any other retention passage may be used that is equivalent to the spiral groove (i.e., a geometry that requires the fuel to flow "uphill" to exit the valve 130). The flow divider/ecology valve 130 has shut-off and ecology piston 132 and flow divider valve 134 that are held to a closed position via springs 136, 138. Piston 132 acts to shut off fuel to both nozzle tips 112, 114 and provides the variable volume ecology cavities for both tips. Valve 134 opens to regulate the flow division or split between the nozzle tips. When the fuel metering unit pressurizing valve 108 is closed and the fuel system is unpressurized, the flow divider/ecology valve 130 will be in the position shown in FIG. 1a. The two springs 136, 138 in the assembly hold the two flow divider valves 132, 134 closed. An elastomeric face seal 140 (i.e., o-ring) prevents leakage from the manifold 106 to either of the nozzle tips 112, 114. Any fuel in the manifold 106 flows to the fuel tank connection 142.

The nozzle passages 116, 118 are bored in housing 144. The retention passages 124, 126 are formed on the inner wall of the housing 144 or on the outer wall of sleeve 146 inserted into housing 144. The cavities 120, 122 are formed within the sleeve 146. In the embodiment illustrated in FIGS. 1–9, the retention passages are formed on the outer wall of sleeve 146.

Figure 2:
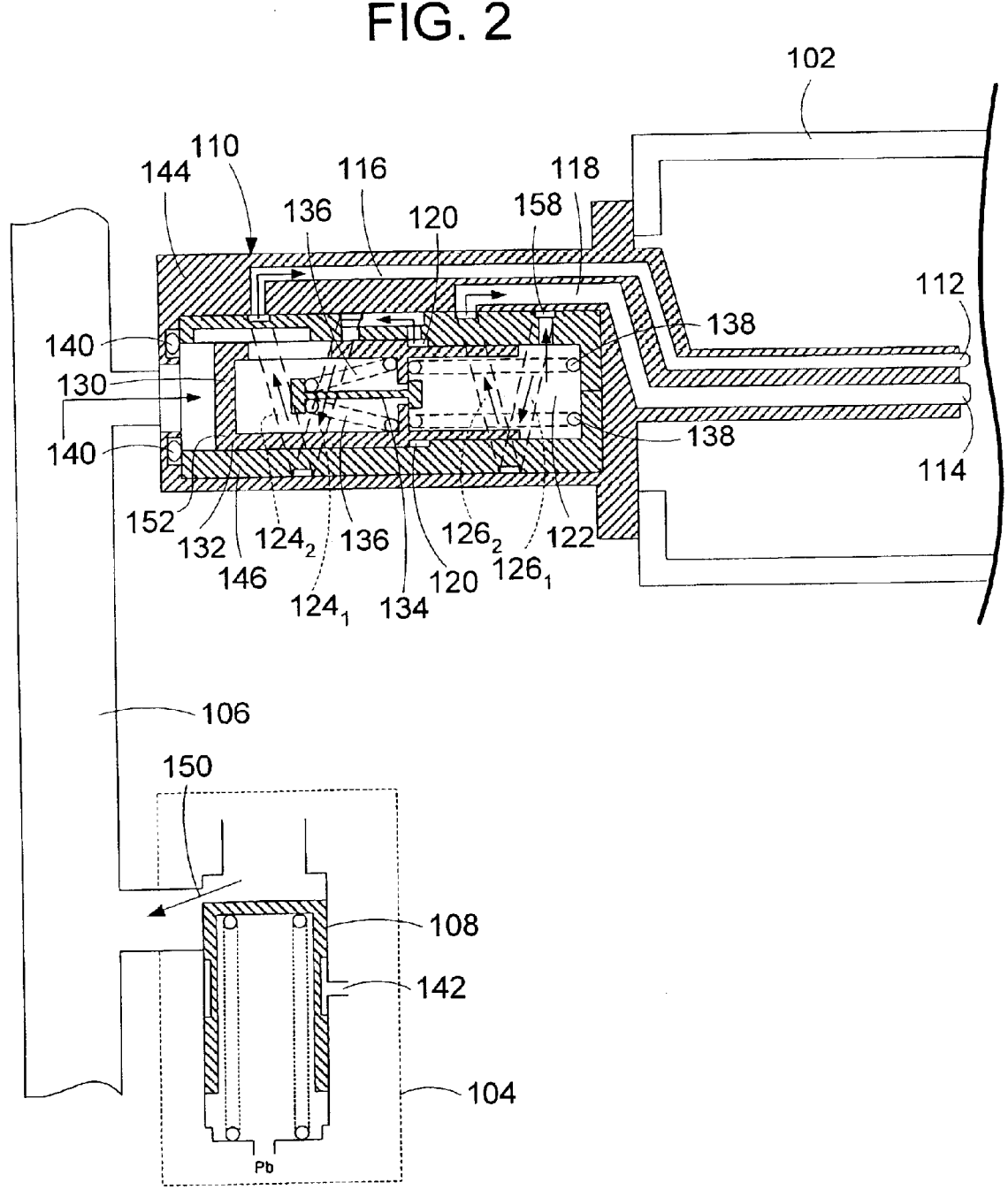
FIGS. 2–4 are cross-sectional views of the valve of the present invention showing the sequential positioning of the piston of the valve as it moves from a deactivated (engine shutdown) position to a fully activated (engine operating) position.

Turning now to FIG. 2, the valve assembly position during starting is shown. The fuel metering unit pressurizing valve 108 has opened and metered flow is being supplied to the fuel manifold 106 as indicated by arrow 150. The connection 142 to the fuel tank is blocked by the pressurizing valve 108. Fuel pressure builds and overcomes the force of the nozzle spring 138 and moves the piston 152 of valve 132 to the right. As the piston 152 translates, fuel that is in ecology cavities 120, 122 is displaced from the ecology cavities 120, 122 that fills the passages 116, 118 leading to the nozzle tips 112, 114. The flow displaced from cavities 120, 122 flows through the retention passage 124, 126 before filling the nozzle passages 116, 118. This retention passage 124, 126 retains fuel in all nozzle locations around the engine circumference. The retention passage 124, 126 allows the installation of the same nozzle assembly at any location around the circumference of the engine, thereby reducing cost since only one type of nozzle assembly is manufactured.

Figure 3:
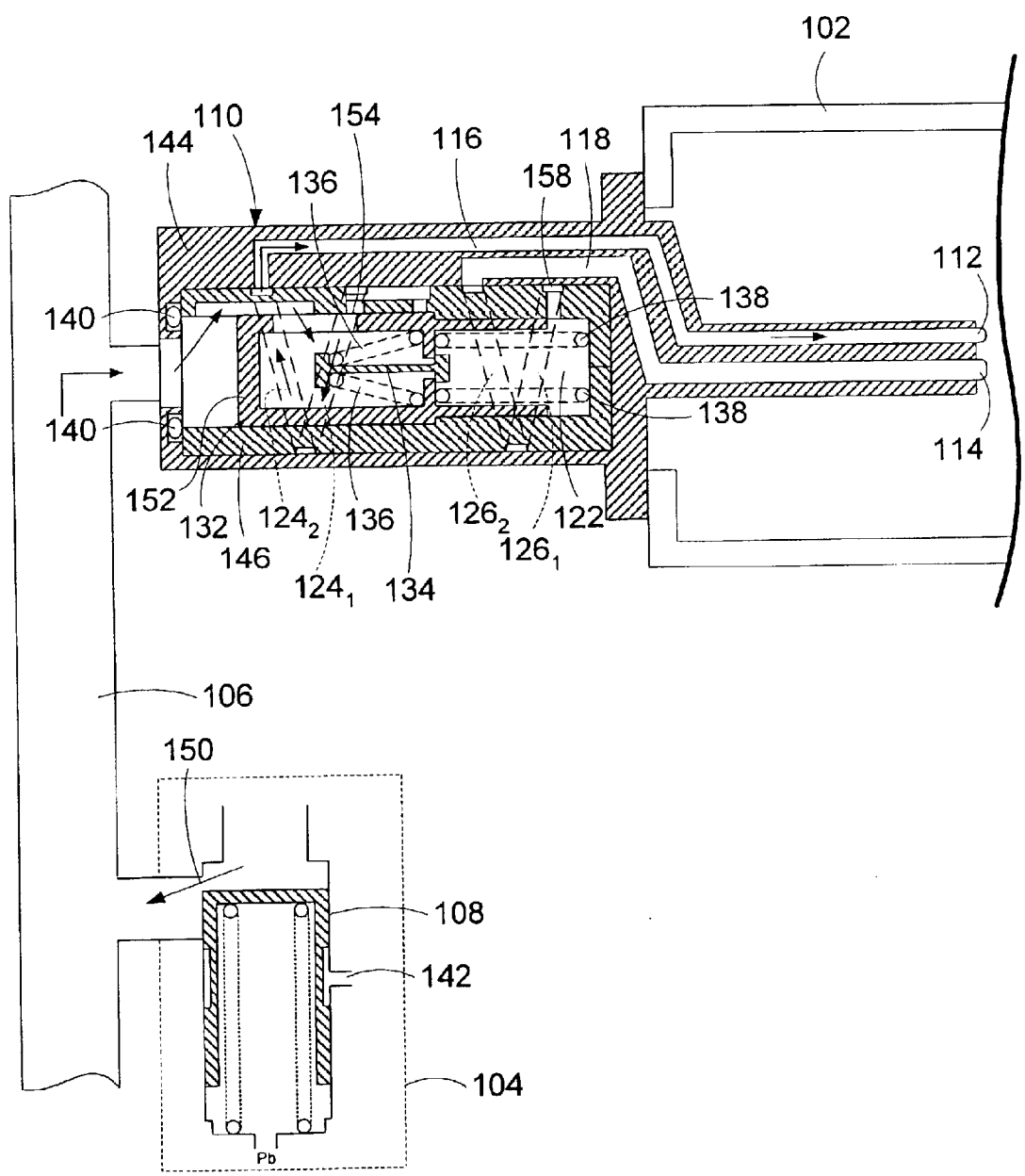

When the piston 152 moves further to the right as illustrated in FIG. 3, port 154 is opened. When port 154 is opened, metered flow is provided to nozzle tip 112. The nozzle valve 134 remains closed until metered flow is increased by the fuel control and pressure builds. As the piston 152 moves to the right, the volume of ecology cavity 120 diminishes and any fuel in the ecology cavity 120 that is displaced by the movement of piston 152 flows into nozzle passage 116.

Figure 4:
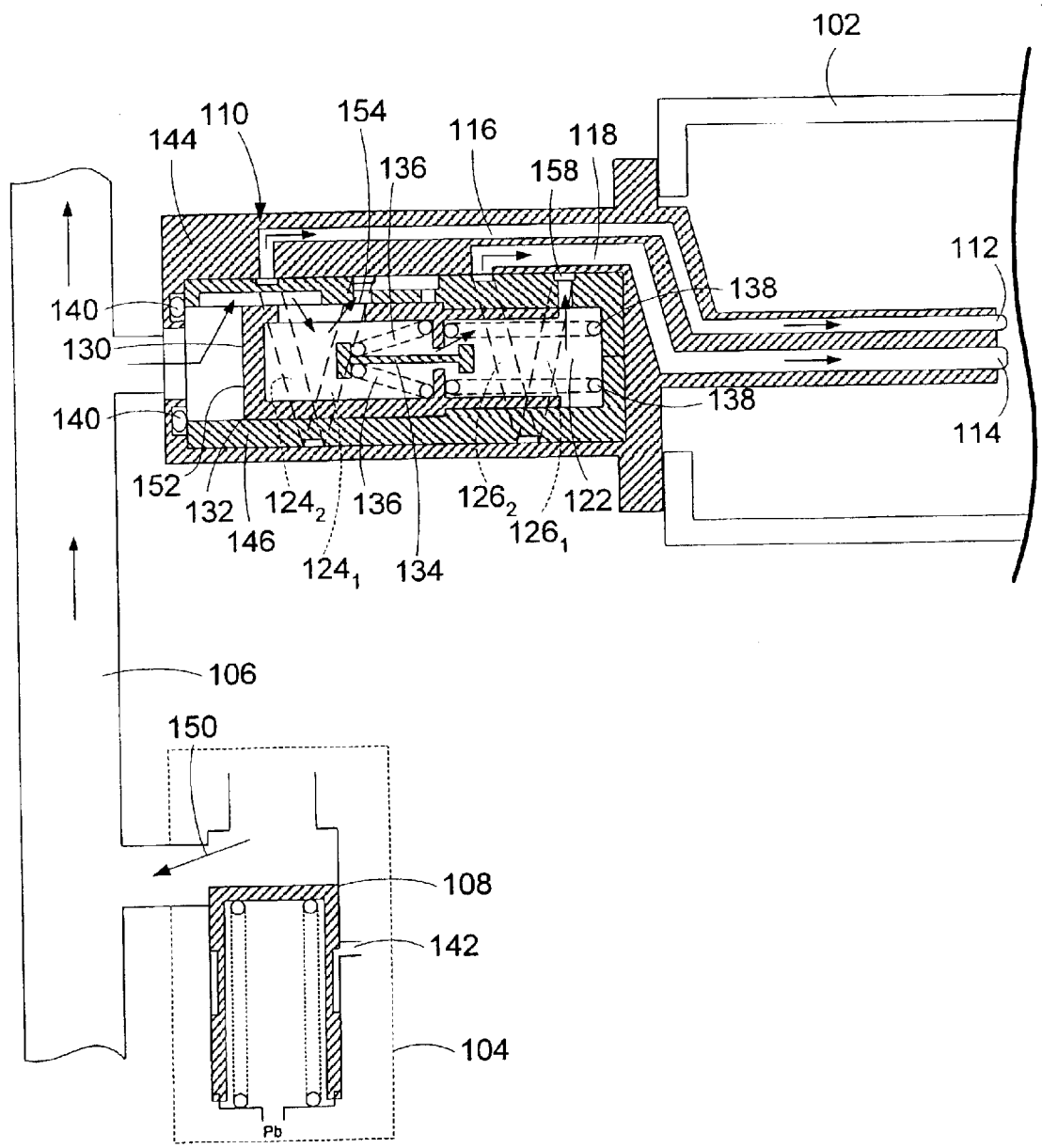

Turning now to FIG. 4, as fuel flow continues to increase, the fuel control fuel pressure will build until it reaches a point where the divider valve 134 opens. Fuel then flows into cavity 122 and to nozzle 114 via port 158, retention passage 126 and nozzle passage 118. Flow division between nozzle 112 and nozzle 114 is determined by the valve port areas, spring forces, and nozzle tip orifice areas. The flow division is known in the art and need not be discussed here.

Figure 5:
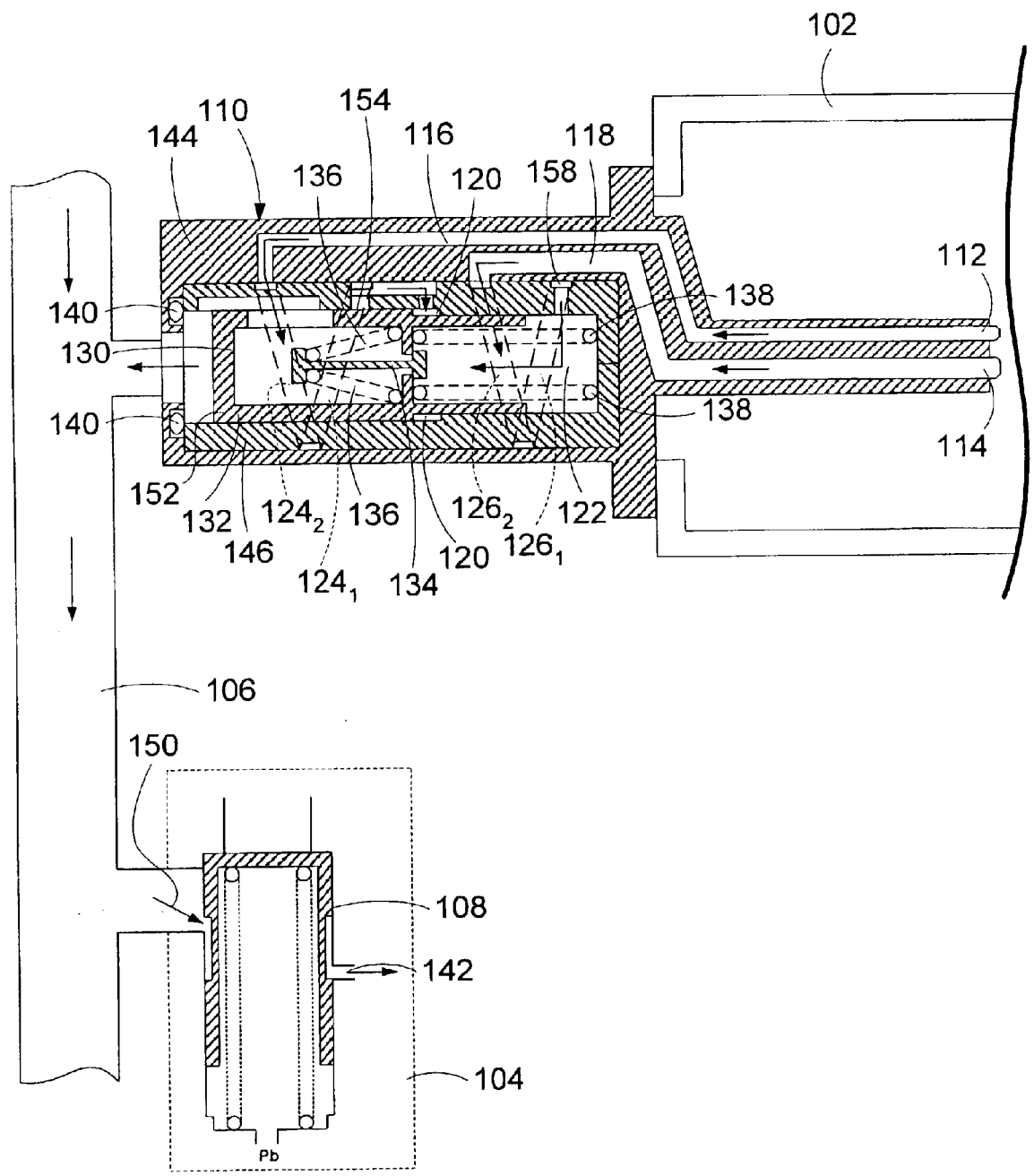
FIG. 5 is a cross-sectional view of the valve of the present invention showing a position of the valve as the valve moves from the fully activated position to the deactivated position.

Turning now to FIG. 5, as the fuel flow decreases, the fuel pressure lowers. When the pressure gets low enough where the spring force is greater than the pressure force, divider valve 134 closes, leaving only nozzle 112 flow. When fuel is selected off by the operator, the pressurizing valve 108 closes. The closing of the valve 108 shuts off fuel to the manifold 106 and simultaneously connects the fuel manifold 106 to the fuel tank via passage 142. This allows the nozzle assembly piston 152 to move to the left as a result of the fuel pressure becoming lower than the force of the spring 138. The movement of the piston 152 to the left creates a suctioning effect that results in fuel being pulled from nozzle passages 116, 118 into the two fuel cavities 120, 122 as the piston 152 moves towards the closed position. Removal of the fuel from the hot passages 116, 118 of each nozzle prevents coking of the fuel in the hot passages 116, 118.

As previously indicated, the retention passage 124, 126 retains fuel in all nozzle locations around the engine circumference, which provides the ability to locate the valve in any position with respect to gravity. For example, FIG. 1b illustrates the valve positioned with respect to gravity such that all the fuel pulled from the nozzle and nozzle passages during engine shutdown as described below is all pulled into the ecology cavities. FIG. 1c illustrates the valve positioned with respect to gravity such that a portion of the fuel pulled from the nozzle and nozzle passages remains in the retention passage when the engine is shut down.

Figure 6:
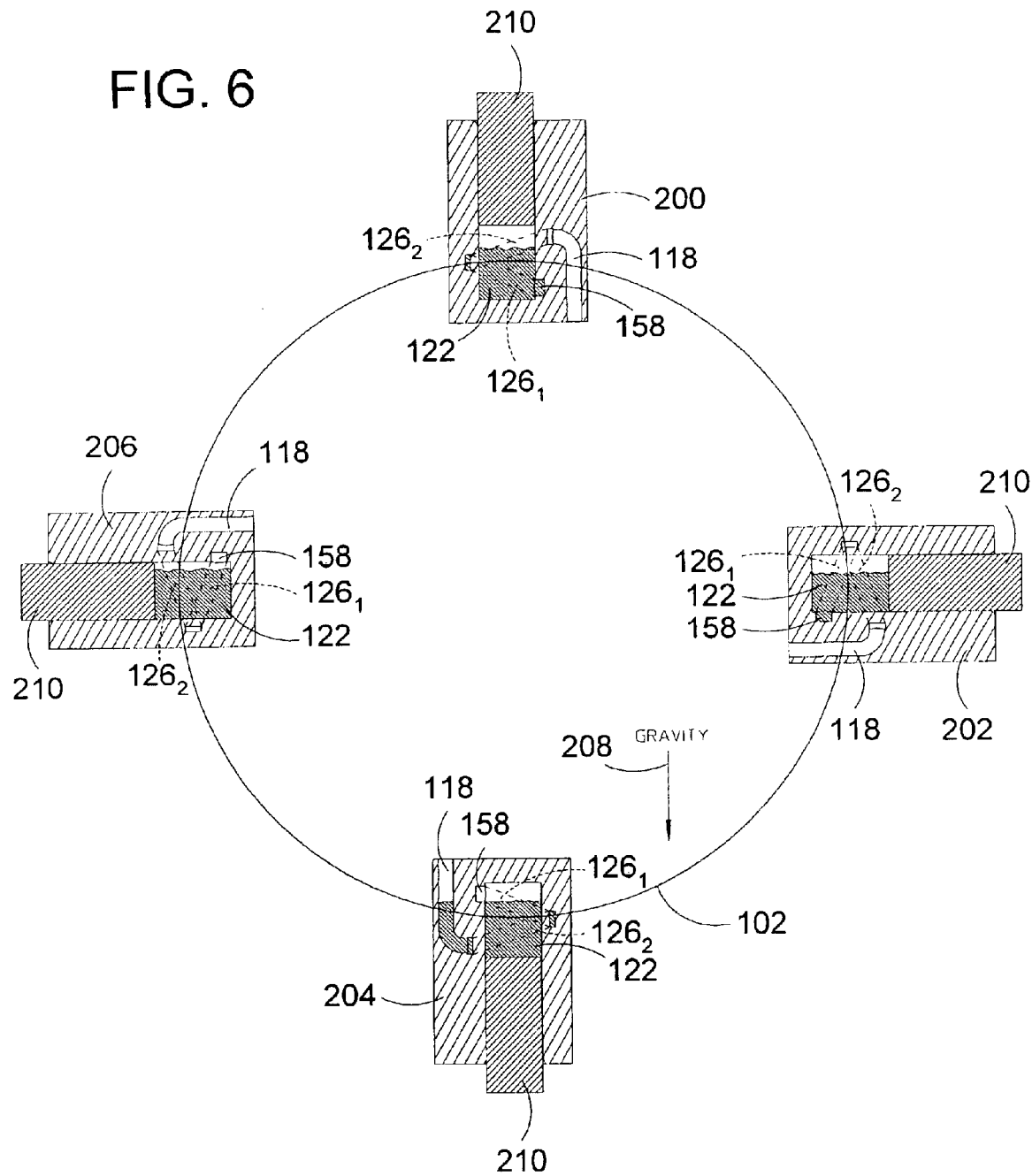
FIG. 6 illustrates the valve of the present invention installed at various locations around the circumference of the engine.

FIG. 6 shows a simplified representation of the valve of the invention at four positions around the circumference of combustion chamber 102 with the valves 132, 134 in the closed position as represented by block 210. For purposes of illustration, only ecology cavity 122 and nozzle passage 118 are shown and the direction of gravity is illustrated by arrow 208. Valve 200 is at a "12 o'clock" position, valve 202 is at a "3 o'clock" position, valve 204 is at a "6 o'clock" position, and valve 206 is at a "9 o'clock" position. With adequate piston translation to pull a small amount of air into each ecology cavity 120, 122, the assembly 100 can be tilted in any position and the fluid in the cavity will have to flow "up hill" through the spiral groove 124, 126 to get out of the assembly 110. The "up-hill" flow prevents fluid from dripping out of the ecology cavities 120, 122. For example, fluid has to travel "up-hill" through section $126_2$ in valve 200 before flowing into the chamber 102. Fluid must travel "up-hill" through section $126_1$ in valve 202 before flowing into chamber 102. In valve 204, fluid in cavity 122 must flow up to retention passage port 158 before it can flow down to nozzle passage 118 and then it must flow "up-hill" in nozzle passage 118 to reach the combustion chamber 102. In valve 206, fluid in cavity 122 must flow up to retention passage port 158 before it can flow down to section $126_1$ and then it must flow "up-hill" in section $126_2$ before it can reach the combustion chamber 102 via nozzle passage 118.

Figure 7:
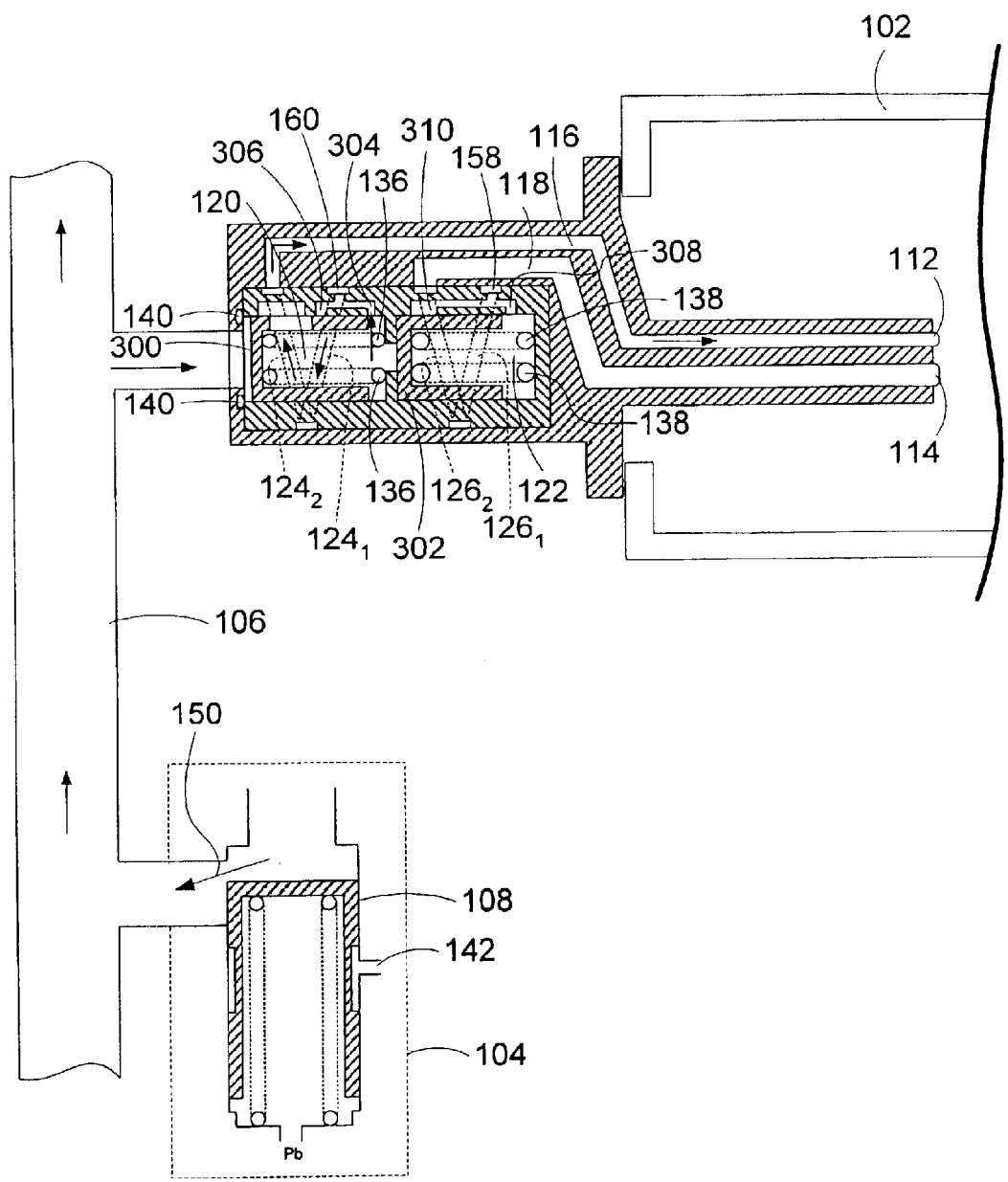
FIGS. 7–9 are cross-sectional views of an alternate embodiment of the valve of the present invention showing the sequential positioning of the piston of the valve as it moves from a deactivated position to a fully activated position.
Figure 8:
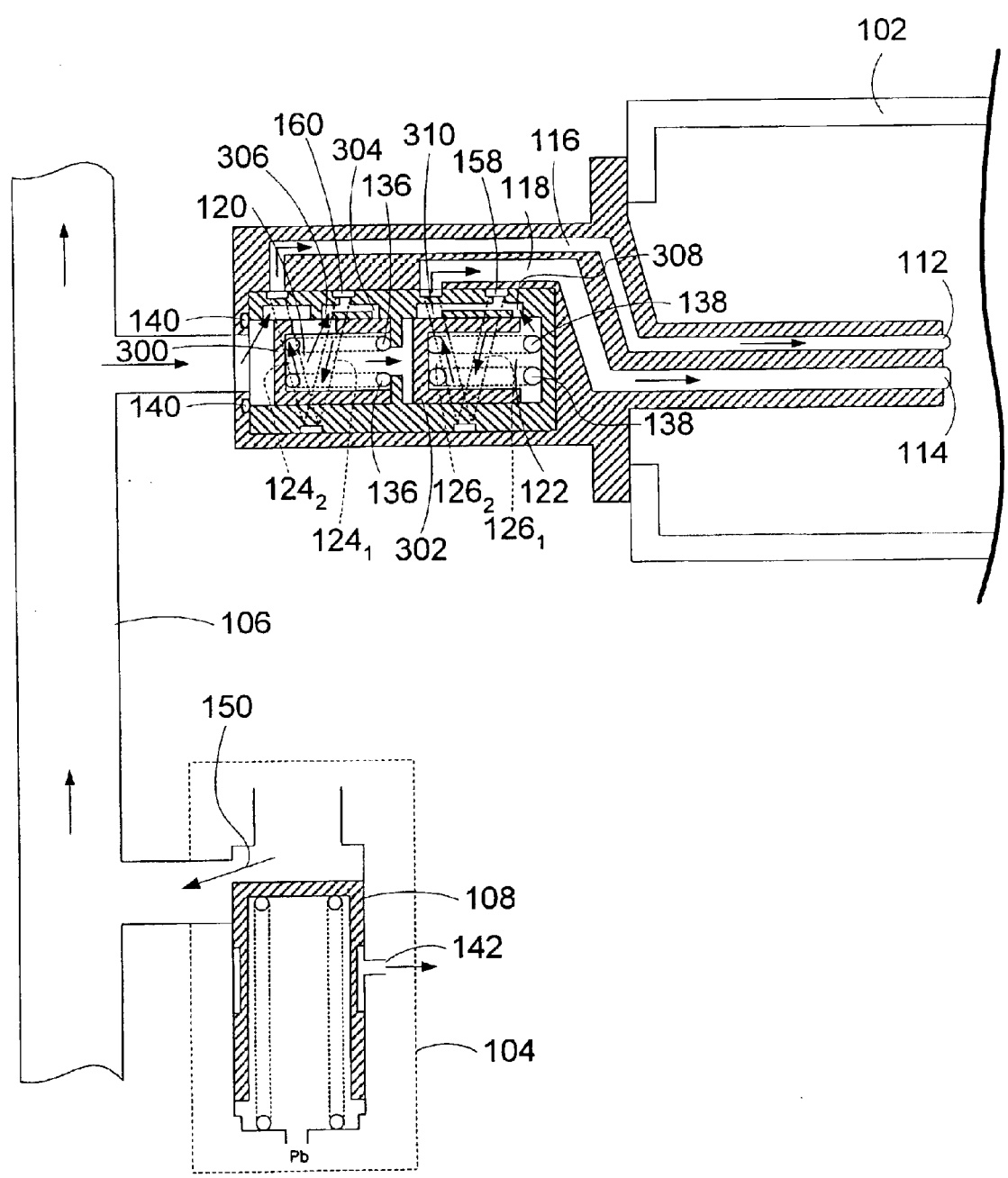
Figure 9:
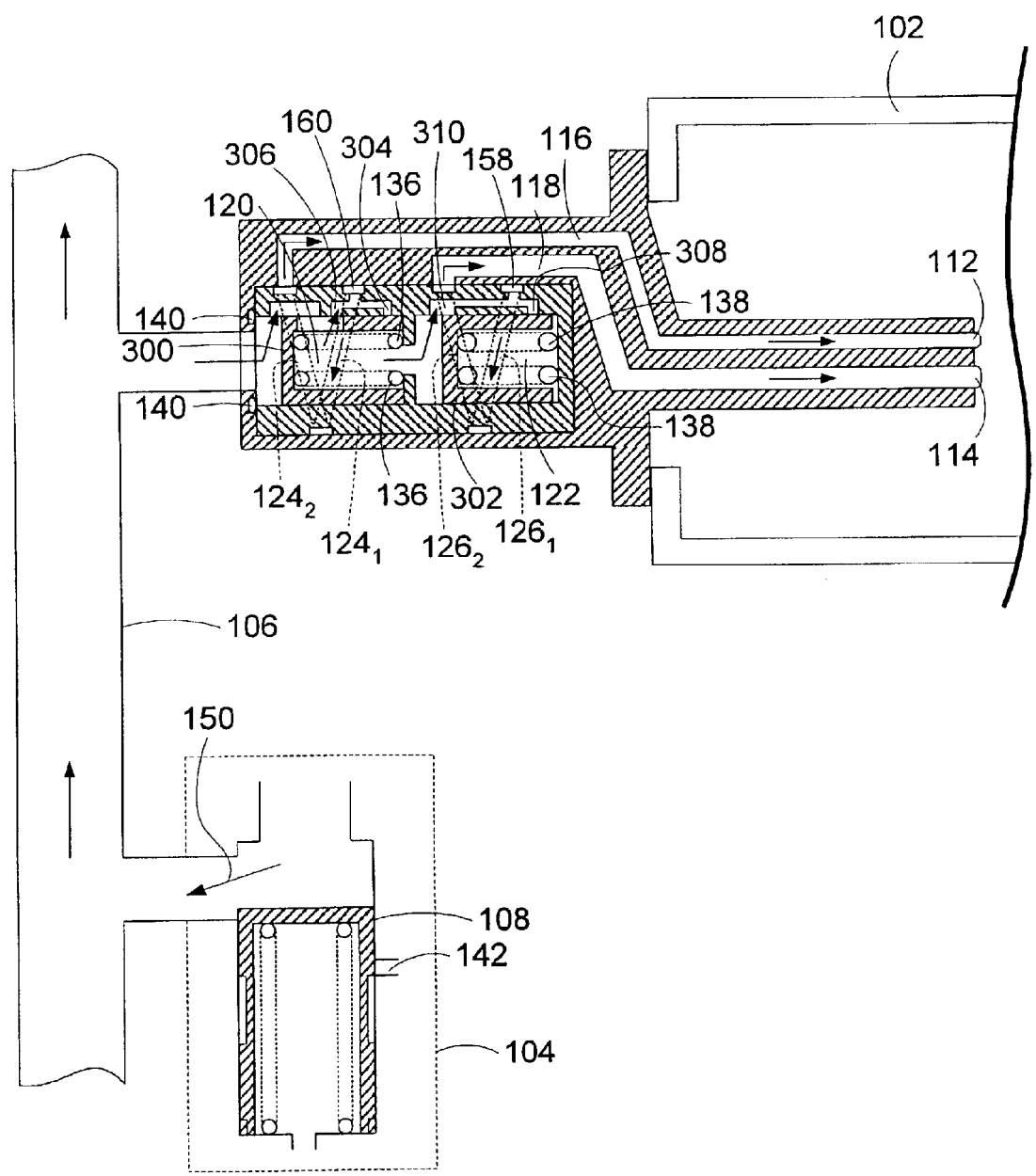

Turning now to FIGS. 7–9, an alternate embodiment of the present invention is illustrated. In this embodiment, two independent pistons 300, 302 are used for the ecology function. This design allows each manifold to be filled and drained independently. This has the advantage of keeping nozzle passage 118 empty (i.e., dry) until just before flow is desired in nozzle 114. When the fuel metering unit pressurizing valve 108 has opened, metered flow is being supplied to the fuel manifold 106 as indicated by arrow 150. The connection 142 to the fuel tank is blocked by the pressurizing valve 108. Fuel pressure builds and overcomes the force of the nozzle spring 136 and moves the piston 300 to the right. As the piston 300 translates, fuel that is in ecology cavity 120 is displaced and flows into passage 116 via port 304 of cavity 120.

When the piston 300 moves further to the right as illustrated in FIG. 8, piston 300 will eventually reach the fully actuated position and port 304 will close and port 306 will open. When port 306 is opened, metered flow is provided to nozzle tip 112. Piston 302 remains closed until metered flow is increased by the fuel control and pressure builds. When pressure is high enough to overcome the force of spring 138, piston 302 will begin to move to the right and fuel in cavity 122 will flow through port 308 and into the retention passage 126 via port 158.

Turning now to FIG. 9, as fuel flow continues to increase, the fuel pressure will build until it reaches a point where the port 310 opens. Fuel then flows into retention passage 126 and to nozzle 114 via port 310 and port 156. Upon shutdown, the system works similar to the first system described. As the fluid pressure decreases, the force of the springs 136, 138 will eventually be higher than the fluid pressure and the pistons 300, 302 will move to the left. The movement of the piston 300, 302 to the left creates a suctioning effect that results in fuel being pulled from nozzle passages 116, 118 into the two fuel cavities 120, 122 via ports 304, 308 as the pistons 300, 302 move towards the closed position. The springs may be sized such that one of the pistons 300, 302 begins to move towards the closed position before the other piston.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A valve having a housing, the valve controlling liquid flow through a retention passage when pressurized liquid is passed through the valve, said retention passage including an inlet and an outlet and located within the housing, the retention passage winding between the inlet and the outlet such that no matter which way the valve is oriented gravity alone is unable to drain liquid from the inlet to the outlet or from the outlet to the inlet.

2. The valve of claim 1 wherein the retention passage includes a groove formed into a cylindrical structure, further comprising a sleeve inserted into the structure enclosing the retention passage.

3. The valve of claim 2 wherein the retention passage includes a spiral section winding axially about an axis between first and second spiral end portions and a nozzle passage section connected to the first spiral end portion extending axially toward said second spiral end portion to prevent drainage.

4. The valve of claim 1 wherein the valve further comprises a valve member movable in the housing, the housing comprising an outer body and a sleeve, wherein a portion of the retention passage is disposed between the outer body and the sleeve.

5. The valve of claim 4 wherein the valve housing has at least one cavity connected to the retention passage and the valve member is movable in the at least one cavity.

6. A valve comprising a valve housing having at least one cavity connected to a retention passage and a valve member movable in the at least one cavity of the valve housing, the valve housing comprising an outer body and a sleeve, a portion of the retention passage being disposed between the outer body and the sleeve, the valve controlling liquid flow through a retention passage when pressurized liquid is passed through the valve, the retention passage including an inlet and an outlet and a nozzle passage section, the retention passage winding between the inlet and the outlet such that no matter which way the valve is oriented gravity alone is unable to drain liquid from the inlet to the outlet or from the outlet to the inlet and the at least one cavity is sized such that fluid in the nozzle passage section is pulled into the at least one cavity when the valve member moves from a first position to a second position.

7. The valve of claim 6 wherein the retention passage further includes a spiral section winding axially about an axis between first and second spiral end portions and the nozzle passage section is connected to the first spiral end portion extending axially toward said second spiral end portion to prevent drainage.

8. The valve of claim 7 wherein the second spiral end portion is connected to the at least one cavity.

9. A valve comprising a valve housing and a plurality of valve members movable in the valve housing, the valve housing comprising an outer body and a sleeve, the valve controlling liquid flow through a retention passage when pressurized liquid is passed through the valve, said retention passage including an inlet and an outlet, the retention passage winding between the inlet and the outlet such that no matter which way the valve is oriented gravity alone is unable to drain liquid from the inlet to the outlet or from the outlet to the inlet, wherein a portion of the retention passage is disposed between the outer body and the sleeve.

10. The valve of claim 9 wherein the retention passage comprises a plurality of retention passages, the valve housing has a plurality of cavities connected to the plurality of retention passages and the plurality of valve members are movable in the plurality of cavities.

11. The valve of claim 10 wherein each of the plurality of retention passages includes a nozzle passage section and the plurality of cavities are sized such that fluid in the nozzle passage section is pulled into the plurality of cavities when the valve member moves from a first position to a second position.

12. The valve of claim 11 wherein the plurality of retention passages further includes a spiral section winding axially about an axis between first and second spiral end portions and the nozzle passage section is connected to the first spiral end portion extending axially toward said second spiral end portion to prevent drainage.

13. The valve of claim 12 wherein the second spiral end portion is connected to one of the plurality of cavities.

14. The valve of claim 10 wherein the plurality of retention passages comprises a primary retention passage connected to a primary fuel nozzle passage and a first cavity of the plurality of cavities and a secondary retention passage connected to a secondary fuel nozzle passage and a second cavity of the plurality of cavities and wherein the secondary retention passage is kept dry until a time when flow is required in the secondary fuel nozzle passage.

15. The valve of claim 11 wherein the valve is locatable at any location around the circumference of an engine combustion chamber.

16. An ecology valve for supplying pressurized fuel from an engine fuel manifold to at least one nozzle passage of an engine during engine operation and for withdrawing fuel from the at least one nozzle passage during shut-down of the engine comprising:

a valve housing including an inlet port adapted to be coupled to a fuel flow of the engine fuel manifold, an outlet port adapted to be coupled to the nozzle passage, a cavity for temporary storage of fuel, and a retention passage adapted to be connected to the cavity and the outlet port, the retention passage winding between the cavity and the outlet port such that no matter which way the ecology valve is oriented gravity alone is unable to drain liquid from the inlet port to the outlet port or from the outlet port to the inlet port; and a movable piston supported within the valve housing for reciprocable motion along an axis and whose position is controlled by fuel pressure, the piston having a first position allowing maximum flow of fuel from the inlet port to the outlet port, and a second position substantially blocking any fuel flow from the inlet port to the outlet port, the piston responding to high fuel pressure at the inlet port to move toward the first position and responding to lower fuel pressure to move toward the second position.

17. The ecology valve of claim 16 further comprising a sleeve inserted into the structure enclosing the retention passage and wherein the retention passage includes a groove formed into one of the valve housing and the sleeve.

18. The ecology valve of claim 16 wherein the cavity is sized such that fluid in the nozzle passage section is pulled into the cavity and retention passage when the movable piston moves from the first position to the second position.

19. The ecology valve of claim 18 wherein the retention passage includes a spiral section winding axially about an axis between first and second spiral end portions and the nozzle passage is connected to the first spiral end portion extending axially toward said second spiral end portion to prevent drainage and the cavity is connected to the second spiral end portion.

20. The ecology valve of claim 16 wherein the retention passage comprises a plurality of retention passages and the cavity comprises a plurality of cavities connected to the plurality of retention passages.

21. The ecology valve of claim 20 wherein the movable piston comprises a plurality of movable pistons that are movable in the plurality of cavities.

22. The ecology valve of claim 16 wherein the ecology valve is locatable at any location around the circumference of a combustion chamber of the engine.

23. A fuel system for use in an aircraft engine, the fuel system comprising:

a fuel pump for pressurizing fuel from a fuel supply, a plurality of fuel nozzles arranged in a combustion chamber, a fuel metering unit for controlling the flow of fuel from the fuel pump to the fuel nozzles;

a fuel manifold fluidically connecting the fuel metering unit to the fuel nozzles, and an ecology valve fluidically connected to the fuel manifold, the ecology valve having a cavity for temporary storage of fuel, a retention passage adapted to be connected to the cavity and one of the fuel nozzles, the retention passage winding between the cavity and the fuel nozzle such that no matter which way the ecology valve is oriented gravity alone is unable to drain fuel from the cavity to the one of the fuel nozzles, and control means for suctioning sufficient fuel into the cavity to prevent coking of the nozzles upon engine shutdown for temporary storage and return of the temporarily stored fuel for combustion in the next engine operating cycle.

24. The fuel system of claim 23 wherein the ecology valve further comprises a body, a pressure actuated piston slidably disposed within the body and movable between an unloaded position corresponding to engine shut-down and a loaded position corresponding to engine operation, the piston forming the cavity, and spring means for biasing the piston toward the unloaded position.

25. The fuel system of claim 23 wherein the retention passage includes a spiral section winding axially about an axis between first and second spiral end portions, the cavity connected to the second spiral end portion, the ecology valve further comprising a nozzle passage connected to the first spiral end portion extending axially toward said second spiral end portion.

26. The fuel system of claim 25 wherein the retention passage comprises a plurality of retention passages and the cavity comprises a plurality of cavities connected to the plurality of retention passages.

27. The fuel system of claim 26 wherein the pressure actuated piston comprises a plurality of movable pistons that are movable in the plurality of cavities.

28. The fuel system of claim 26 wherein the plurality of retention passages comprise a primary retention passage connected to a primary fuel nozzle passage and a first cavity of the plurality of cavities and a secondary retention passage connected to a secondary fuel nozzle passage and a second cavity of the plurality of cavities and wherein the secondary retention passage is kept dry until a time when flow is required in the secondary fuel nozzle passage.

29. The fuel system of claim 23 wherein the ecology valve further comprises a body and a pressure actuated piston slidably disposed within the body, the control means translates the pressure actuated piston to expand the cavity and create a suctioning effect to draw fuel from the one of the fuel nozzles.

* * * * *